UNITED STATES PATENT OFFICE.

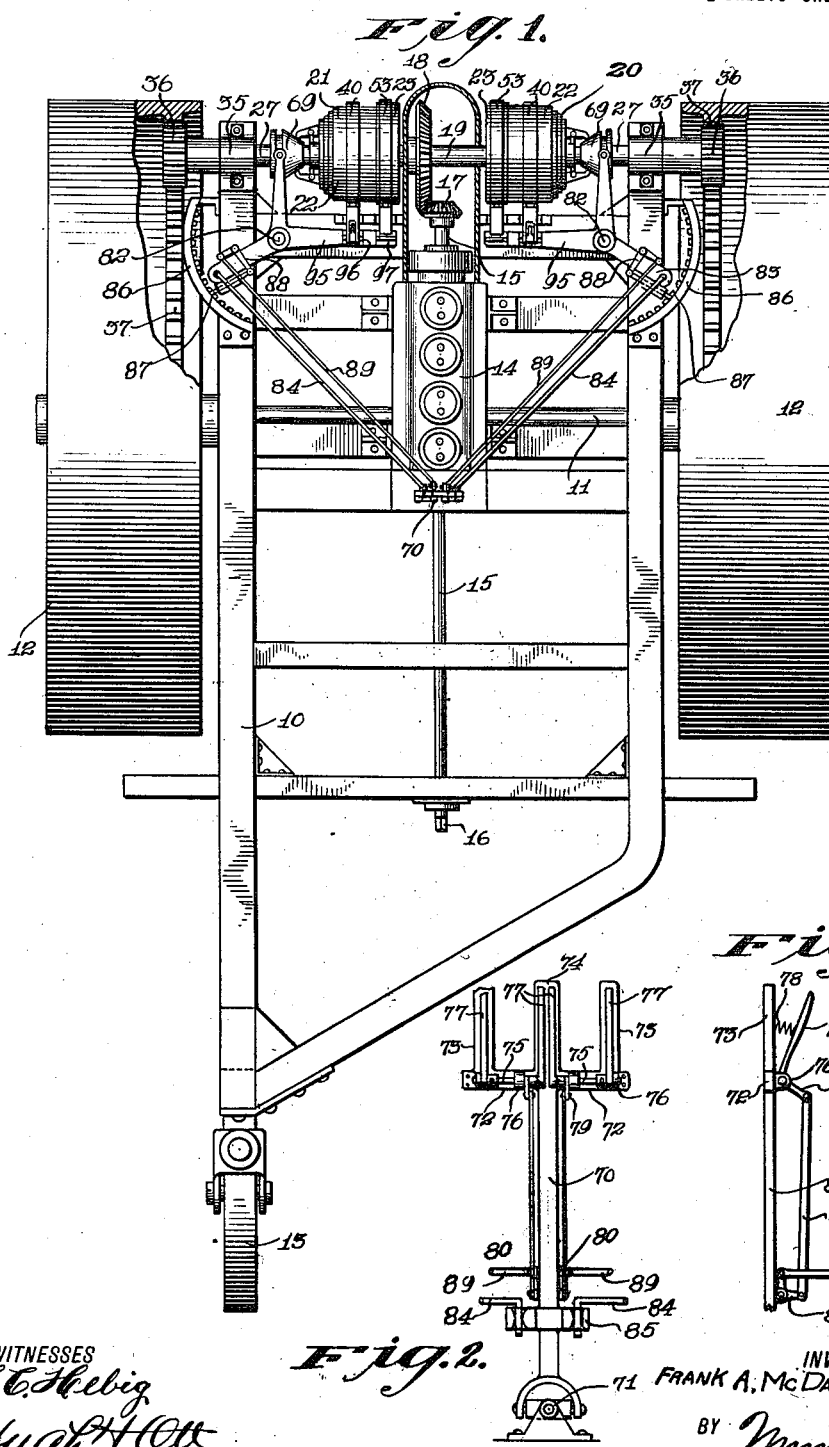

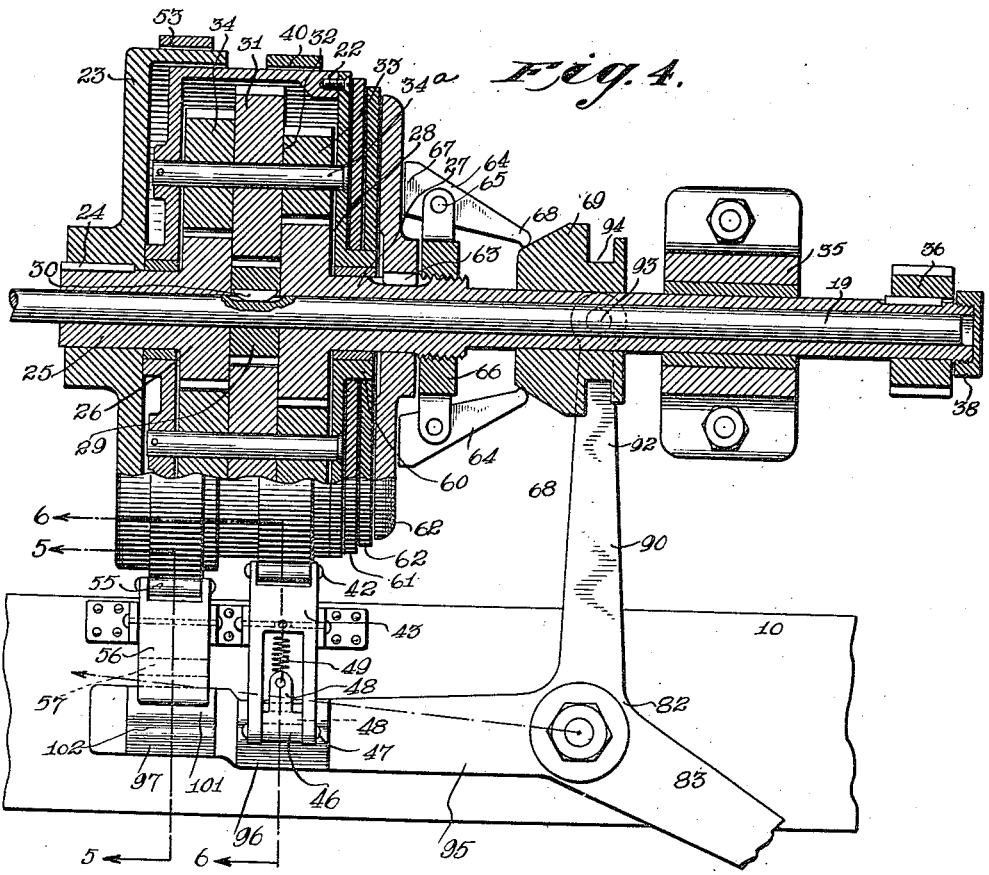

FRANK ALBA McDANIELS, OF PORTLAND, OREGON.

TRACTOR CONTROL.

1,413,414. Specification of Letters Patent. Patented Apr. 18, 1922.

Application filed December 28, 1920. Serial No. 433,617.

*To all whom it may concern:*

Be it known that I, FRANK A. MCDANIELS, a citizen of the United States, and a resident of Portland, in the county of Multnomah and State of Oregon, have invented a new and Improved Tractor Control, of which the following is a full, clear, and exact description.

This invention relates to a controlling mechanism for self propelled vehicles and is particularly designed for use in connection with farm tractors or the like.

The invention contemplates and seeks for one of its principal objects to provide a comparatively simple and effective controlling mechanism for tractors, in order to simplify the operation and steering of the same, whereby to render it readily operable by persons totally unfamiliar with its structure and without lengthy instructions.

Another object in view is to provide a controlling mechanism of the character described which employs a single control lever, shiftable in various directions to effect the driving of the machine forward or rearward, or to the right or left, at variable rates of speed.

A further object of the invention resides in the provision of a novel form of power transmitting means located between the power plant and each of the tractor elements.

A still further object in view is to provide a lever including means located conveniently thereon for selectively actuating the transmission means to obtain the various speeds and direction.

With the above recited and other objects in view, some of which will appear hereafter as the nature, purpose and operation of the invention is more fully understood, reference is had to the following specification, the appended claims and the accompanying drawings, in which;

Figure 1 is a plan view of a tractor equipped with the power transmitting means and controlling mechanism therefor, parts being broken away to disclose the underlying structure.

Figure 2 is a detail front elevation of the control lever.

Figure 3 is a fragmentary detail side view thereof.

Figure 4 is a fragmentary plan view of one of the transmissions and the associated elements, with parts in section.

Figure 5 is a fragmentary sectional view taken approximately on the line 5—5 of Figure 4.

Figure 6 is a similar view taken on the line 6—6 of Figure 4.

Referring to the drawings by characters of reference, 10 designates the chassis or frame of the tractor which is provided with a transverse axle 11 on the outer ends of which are mounted the tractor wheels 12. The usual caster wheel 13 is journaled in a vertical bearing at the rear of the chassis as illustrated. The motor or prime mover 14 is mounted on the frame adjacent the forward portion thereof and is provided with the usual drive shaft 15, the rear end of which extends through the chassis and is squared as at 16 for the reception of a suitable crank for starting the motor. The drive shaft has keyed on its forward extremity a beveled gear 17 which meshes with a beveled pinion 18 keyed on the transverse jack shaft 19 which extends through the transmissions 20 and 21 disposed at opposite sides of the beveled pinion 18. The transmission mechanisms 20 and 21 are of identical construction and each comprise a pair of concentric housings 22 and 23, the latter being keyed as at 24 to the sleeve 25 of the gear 26. The housing section 22 is loosely mounted on the sleeve 25 between the housing 23 and the gear 26 and on the sleeve 27 of the gear 28. A master gear 29 is keyed as at 30 to the jack shaft 19 between the confronting faces of the gears 26 and 28 and said master gear meshes respectively with the center pinions 31 of a plurality of planetary pinion blocks 32 which include the pinions 33 and 34 on the opposite sides thereof. The pinion block 32 is mounted on the counter shafts 34ª which bears in the opposite side walls of the housing 22. The pinions 33 and 34 mesh respectively with the gears 28 and 26. The sleeve 27 of the gear 28 extends outwardly through a bearing block 35 mounted on the chassis 10 and the extreme outer extremity of said sleeve has keyed thereto a pinion 36 which meshes with the annular rack teeth 37 which projects inwardly from the inner periphery of the tire of the tractor wheel 12. A dust cap 38 is threadedly engaged over the outer end of the sleeve to exclude the possible entrance of dirt or other foreign matter and to provide means for lubrication. The outer periphery of the housing 22 constitutes a drum which is embraced by the split clutch band 40, one extremity of which is secured as at 41 to the chassis or frame 10 and the opposite extremity of which is connected by the knuckle joint 42 to one extremity of a rock arm 43 which is fulcrumed as at 44 between the bearing ears 45 mounted on the chassis. The rock arm 43 is bifurcated at its free end and receives between its furcations a lug 46 which is mounted on the transverse pin 47 for swinging movements. The inner side of the lug 46 is provided with an apertured extension 48 which is connected by a coiled expansion spring 49 to the apertured web 50 on the rock arm 43. A transverse bar 51 limits the swinging movement of the lug in one direction and the spring 49 serves to normally effect engagement of the extension 48 with said stop bar 51. The outer periphery of the housing section 23 constitutes a drum which is embraced by the clutch band 53, one extremity of which is secured as at 54 to the chassis 10 and the opposite extremity of which is connected by a knuckle joint 55 to the rock arm 56 which is fulcrumed as at 57 between spaced upstanding ears 58 mounted on the chassis frame. The underside of the free extremity of the rock arm 56 is provided with a depending lug 58 for a purpose to be hereafter set forth. The outer wall of the housing section 22 is provided adjacent its bearing opening which receives the sleeve 27, with an annular boss 60 on which is mounted a plurality of discs 61 constituting a friction disc clutch. A covering disc 62 is splined as at 63 to the sleeve 27 and the inner surface thereof is adapted to be advanced against the discs 61 for frictionally engaging the discs 61 with each other and with the outer surface of the housing section 22 for frictionally locking the gear 28 to said housing section 22, for simultaneous rotation therewith. The means for advancing the disc 62 against the discs 61 comprises a plurality of levers 64 pivoted at 65 to the ring 66 carried by the sleeve 27, the inner ends of said levers being cammed as at 67. The outer extremities 68 of said levers co-act with a conical spreader block 69 slidably mounted on the sleeve 27 whereby radial spreading or contraction of the extremities 68 will be effected to throw the cammed ends 67 toward or away from the disc 62.

A common means is provided for controlling the transmission mechanisms and the same includes the control lever 70 which is universally mounted as at 71 on the chassis 10 at a point in rear of the motor 14. The control lever is cruciform shaped at the upper end, the portions 72 having upright hand grips 73 transversely spaced from the central hand grip 74. A pair of aligned transverse shafts 75 are mounted on each of the side portions 72 in the bearings 76 and the opposite extremities of each shaft have keyed thereto the grip levers 77. The innermost grip levers 77 are disposed in alignment with the central hand grip 74 and the outermost levers 77 are disposed in alignment with the outer hand grip 73 whereby upon grasping of either of the outer hand grips, rotation of its respective shaft 75 will be effected. Upon grasping the center hand grip 74 simultaneous rotation of both of the shafts 75 will be effected. Coiled contractile springs 78 normally exert a tension to thrust the grip levers 77 away from the hand grips. Each of the shafts 75 is provided with a radially disposed arm 79 which is connected at its free end to one of the arms of a bell crank lever 80 by a connecting rod 81. A Y-shaped lever 82 is mounted for horizontal swinging movement on the forward portion of the frame or chassis 10 and the arm 83 thereof is connected at its free end by the connecting rod 84 to the lower portion of the control lever 70 as at 85. A concentric segment 86 is mounted on the chassis adjacent the free extremity of the arm 83 of the Y lever 82 and a detent 87 is carried by the arm 83 and is adapted to co-act with the segment to retain the Y-lever 82 in its various shifted positions. The detent 87 is operated by a bell crank 88 mounted on the arm 83. The bell cranks 80 and 88 are connected by the rod 89 whereby upon the grasping of the hand grips 73 or 74, the detents 87 will be disengaged from the segments 86. The arm 90 of the Y lever 82 is forked as at 92 and is provided with trunnions 93 which operate in the annular groove 94 of the spreader block 69 for moving the same on the sleeve 27. The remaining arm 95 of the Y lever 82 is provided respectively with the ramps 96 and 97 which co-act respectively with the rock arms 43 and 56 of the clutch band 40 and 53. The ramp 96 is provided with oppositely beveled faces 98 and 99 and a center depression 100 formed in its upper face. The ramp 97 is provided with a beveled side wall 101 and has formed in its upper surface a depression 102. By this arrangement it is obvious that movement of the arm 95 in either direction toward the lug 46 will lift the outer end of the rock arm 43 due to the engagement of the beveled faces 98 and 99 with the lug which subsequently seats in the depression 100. This results in the movement of the inner end of the rock arm 43 toward the connected end of the clutch band 40, thereby contracting the same about the housing section 22, likewise the movement of the arm 95 toward the lever 56 effects the lifting of the same by the engagement of the inclined face 101 of the ramp 97 with the lug 58 which finally seats in the depression 102. This movement will disengage the lug 46 from the depression 101 of the ramp 96 to release the clutch band 40 from the housing section 22 and will successively effect the frictional engagement of the clutch band 53 with the housing section 23. When the Y lever is moved in the opposite direction, the arm 95 will disengage the ramps 96 and 97 from their respective lugs 46 and 58 and at the same time project the conical spreader 69 toward the disc 62 to spread the extremities 68 of the levers 64, thereby effecting frictional engagement of the friction disc clutch with the housing section 22 to lock the same to the gear 28.

In operation of the tractor, presuming that the motor has been started, to obtain direct forward movement at low speed, the center hand grip 74 and the grip levers 77 are grasped and the lever is swung straight forward. The grasping of the center grip 74 releases the detents of both of the Y levers and effects simultaneously the positioning of the lugs 46 in the depressions 100. In this position both of the clutch bands 40 lock the housing sections 22 against rotation. The jack shaft which is rotating in a forward direction with the master gears 29, will drive the sleeves 27 forward at a relatively reduced rate of speed through the reducing pinions 31, 33 and the gear 28. To obtain high speed in a forward direction, the center grip 74 is again grasped to simultaneously release the detents 87 and the control lever 70 is thrust further forward. The further forward movement of the control lever will swing the arm 95 of the Y lever away from the rock levers 43 to loosen the clutch bands 40 and at the same time the arm 90 of the Y lever will advance the spreader block 69 towards the discs 62. This movement of the spreader blocks will spread the outer extremities 68 of the levers 64 and advance the discs 62 and 61 against the outer faces of the housing sections 22, thereby locking said housing sections to the sleeves 27 and gears 28. The housing section 22 will then rotate with the jack shaft at the same speed of said jack shaft. To obtain a direct rearward drive, the center hand grip 74 of the lever is grasped to disengage the detents 87 from the segments 86 and the lever is pulled directly to the rear. The rearward movement of the lever will exert a pull on the connecting rods 84 and the arms 83 of the Y levers to move the spreader block 69 outwardly for disengaging the friction disc clutch and simultaneously throwing the arm 95 toward the rock arms 56 whereby to advance the inclined surfaces 101 of the ramps 97 into engagement with the lugs 58 to lift the outer end of the rock arms 56 and position the lugs 58 in the depressions 102. This will effect frictional engagement of the clutch bands 53 with the casing sections 23, locking said casing sections 23 and the gears 26 against rotation. The jack shaft 19 through the master gears 29 will planet the pinion blocks 32 in the opposite direction, thus rotating the housing section 22 and the sleeve 27 rearwardly to obtain direct rearward movement of the tractor. To turn the tractor to the right, when the same is running at high or low speed in a forward direction, the hand grip 73 at the right of the control lever is grasped to effect disengagement of the right detent 87 from its segment 86 and due to the universal mounting of the lever the same may be swung to the rear using the point of connection of the connecting rod 84 with the arm 83 of the right Y lever 82 as a fulcrum.

From the foregoing it will be seen that the tractor controlling means is provided which is extremely simple and natural in its operation.

It is however, to be understood that the showing is merely illustrative of one form of means by which the invention may be reduced to practice and that the right to embodiments other than those actually set forth herein is reserved, to the full extent indicated by the general meaning of the terms in which the claims are expressed and by variations in the phraseology of the same.

I claim;

1. A self-propelled vehicle comprising a body, a pair of tractor elements thereon, a prime mover, power transmitting mechanisms between the prime mover and each tractor element for effecting forward and reverse driving of the latter, an actuator for each mechanism, a common control lever for said actuators, retaining means for each actuator for holding the same in its adjusted positions, and means on the lever for simultaneously or independently effecting the release of the retaining means.

2. In a self-propelled vehicle, a prime mover, a pair of tractor elements, a power transmitting mechanism between each element and the prime mover, said mechanisms including independently operable means for effecting forward and rearward driving of its tractor element at high or low speed, means for controlling said mechanisms comprising a separate actuator for each mechanism, operable upon movement thereof to render one of said means active and the remainder inactive, a common control lever for said actuators, means for holding the actuators in their adjusted positions against movement, and means on the lever for simultaneously or independently releasing the retaining means.

3. The combination with a tractor, including a frame, tractor elements thereon, a prime mover, a power transmitting mechanism between the prime mover and each of the tractor elements, of independent means for effecting forward driving of said tractor elements at high or low speed, means for effecting reverse driving of the same, an actuator for such mechanism constituting means whereby upon movement thereof, to render one of said means active, the remainder are rendered inactive, a common control lever for said actuators, retaining means for each actuator for holding the same in their adjusted positions against a movement, and means on the lever for simultaneously or independently releasing the retaining means.

4. In a tractor, including a frame having tractor elements thereon, a prime mover and a power transmitting mechanism between the prime mover and each tractor element, said mechanism having means for respectively effecting the driving of the tractor elements forward at high or low speed, or reverse, the combination with a Y shaped lever for each mechanism constituting a common actuator for the means thereof, whereby upon movement of said lever to render one of the means active, the remainder are rendered inactive, a control lever for said Y shaped levers, retaining means for each of said Y levers for holding the same in their adjusted positions against movement, and means on the controlling lever for simultaneously or independently releasing said retaining means.

5. In a tractor, including a frame having tractor elements thereon, a prime mover and a power transmitting mechanism between the prime mover and each tractor element, said mechanism having means for respectively effecting the driving of the tractor elements forward at high or low speed, or reverse, the combination with a Y shaped lever for each mechanism constituting a common actuator for the means thereof, whereby upon movement of said lever to render one of the means active, the remainder are rendered inactive, a control lever for said Y shaped levers, retaining means for each of said Y levers for holding the same in their adjusted positions against movement, and means on the controlling lever for simultaneously or independently releasing said retaining means, said control lever being shiftable in various directions for the purpose specified.

FRANK ALBA McDANIELS.